Figure 6:
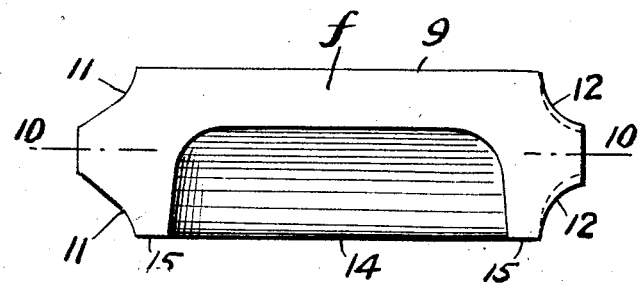

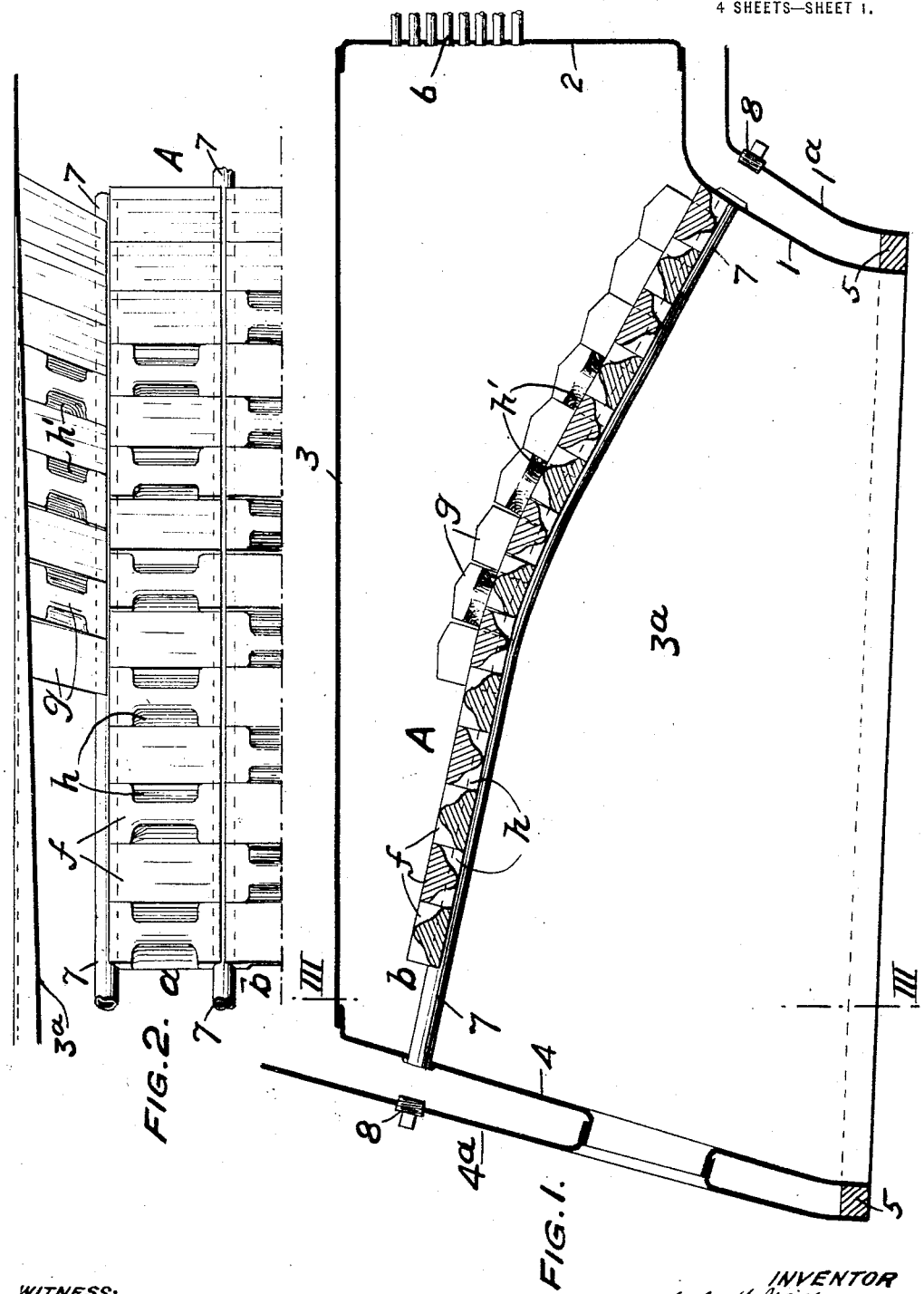

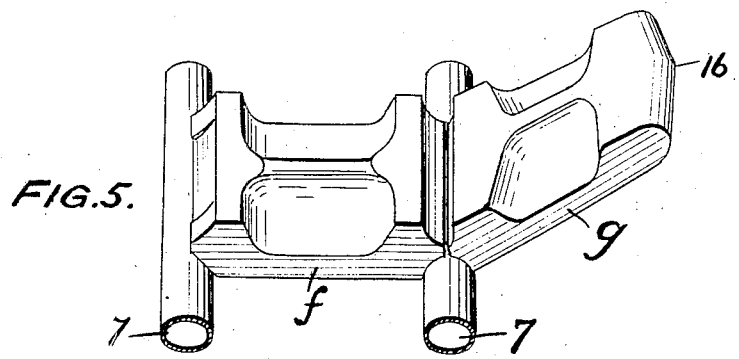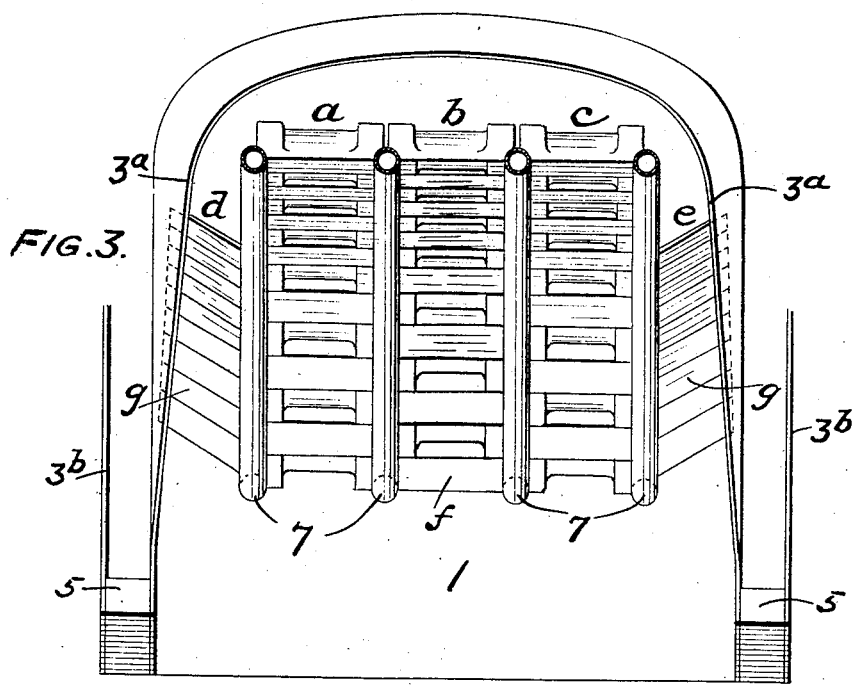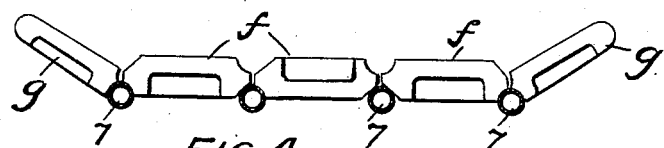

A. H. WILLETT.
ARCH AND ARCH BRICK.
APPLICATION FILED JULY 10, 1916.

1,394,873.

Patented Oct. 25, 1921.

4 SHEETS—SHEET 3.

WITNESS:
Rob't R. Kitchel.

INVENTOR
Alfred H Willett
BY
Symmes, Bradley, Leckner & Fink
ATTORNEY.

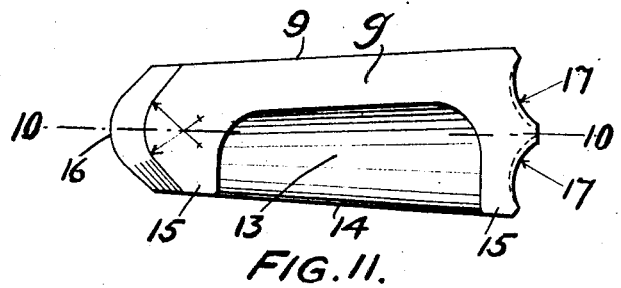
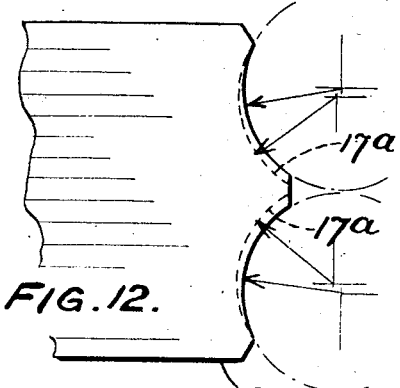
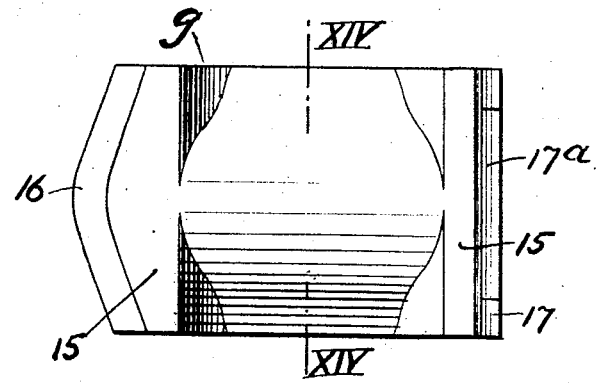
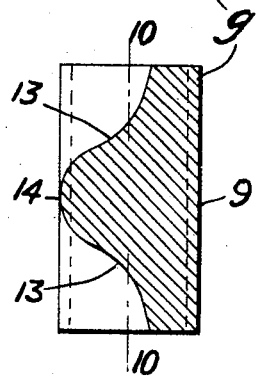
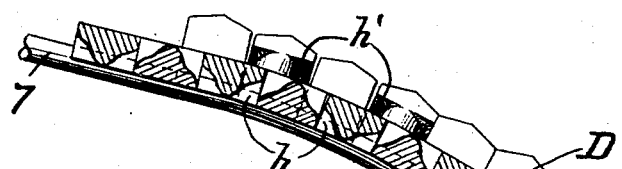
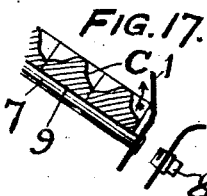
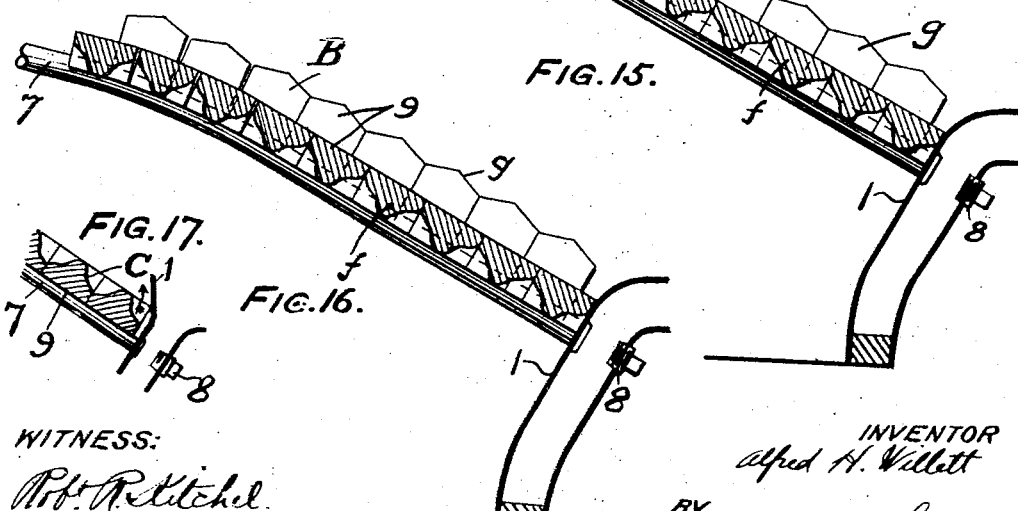

UNITED STATES PATENT OFFICE.

ALFRED H. WILLETT, OF WEST NEW YORK, NEW JERSEY, ASSIGNOR TO AMERICAN ARCH COMPANY, OF NEW YORK, N. Y., A CORPORATION OF NEW YORK.

ARCH AND ARCH-BRICK.

1,394,873.  Specification of Letters Patent.  Patented Oct. 25, 1921.

Application filed July 10, 1916. Serial No. 108,306.

*To all whom it may concern:*

Be it known that I, ALFRED H. WILLETT, a citizen of the United States, residing at West New York, in the county of Hudson and State of New Jersey, have invented certain new and useful Improvements in Arches and Arch-Bricks, of which the following is a specification.

This invention relates to improvements in arches and arch bricks and the invention is particularly useful on locomotives.

One of the primary objects of my invention resides in an improved construction of arch brick, by means of which it is possible to form not only three different and distinct types of arches, but also arches embodying combinations of these types. Thus from a single form of brick an arch may be constructed which may be adapted to any one of a number of different kinds of service, and in each instance the conditions peculiar to the particular service will be met and in such manner as to secure superior combustion and maximum efficiency, as will further appear. It is also one of the chief objects of my invention to provide an improved arch brick having the characteristics specified which is very simple and light in construction, but the body of which is nevertheless so disposed as to secure maximum strength and superior wearing qualities, while at the same time the bricks may be readily installed in the form of an arch, any one or more of the bricks being easily shifted to alter the arrangement of the arch to suit change in service conditions, or as easily taken out and replaced with new bricks as required. Another object of the invention resides in the provision of an arch brick of the characteristics specified which is easily manufactured and which is very economical, measured by the superior results obtained and the variety of different kinds of service conditions which can be met.

One of the more specific objects of the invention is to provide a novel and improved construction of invertible arch brick whereby the advantages herein pointed out may be secured.

My invention also contemplates the provision of an arch having improved characteristics whereby better combustion and increased efficiency are secured through more intimate and extended admixture of the gases and superior heat radiation qualities, while at the same time the flues are protected to a greater extent than heretofore. It is also one of the objects of the invention to provide an arch of the characteristics specified which can be easily altered to suit change in service conditions without necessarily changing any of the bricks by substitution. In addition, it is one of the objects of my invention to provide an improved arch which is more or less self-cleaning.

It is also an object of my invention to provide an improved arch brick and arch whereby it is possible to greatly increase the size of the arch in fire boxes having a low crown sheet, that is to say, in fire boxes somewhat shallow in depth, thereby securing a greater protection for the flues and also better combustion and greater efficiency than has heretofore been possible in fire boxes of such construction.

Figure 7:
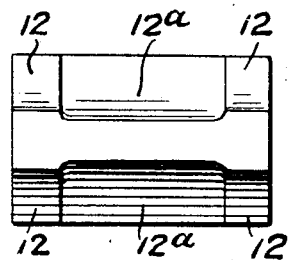
Figure 8:
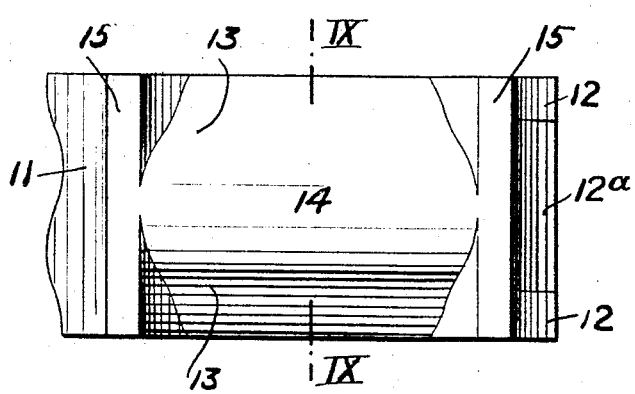
Figure 9:
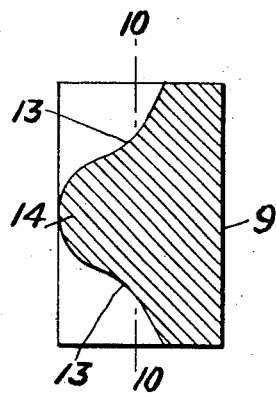
Figure 10:
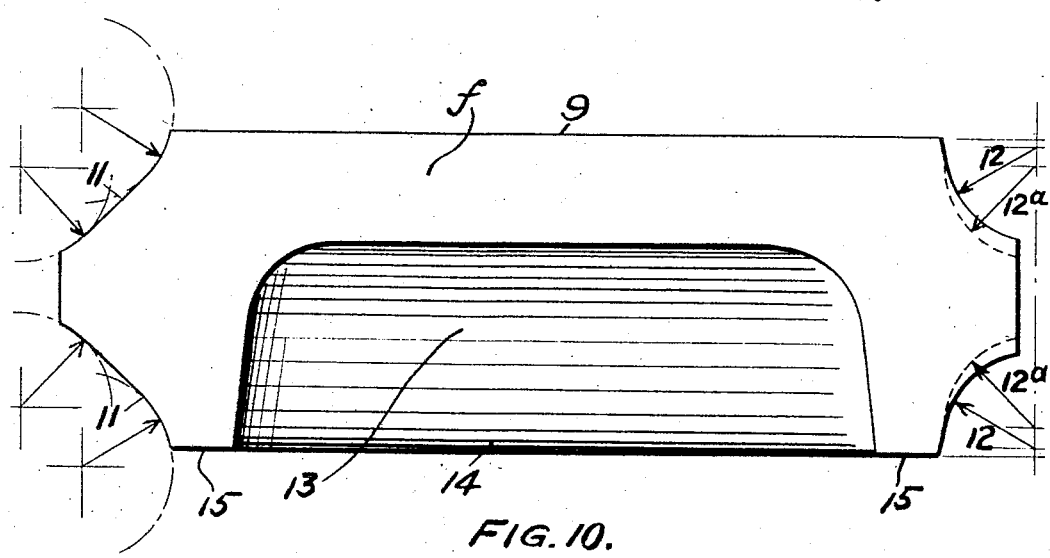

The foregoing, together with such other objects as may hereinafter appear, or are incident to my invention, I obtain by means of a construction which I have illustrated in preferred form in the accompanying drawings, wherein, Figure 1 is a longitudinal section through a locomotive fire box showing the preferred type of arch and also showing the cross-sectional configuration of the bricks; Fig. 2 is a horizontal section through half of the fire box showing the arch in plan view; Fig. 3 is a section on the line III—III of Fig. 1; Fig. 4 is an end elevation of the arch of Fig. 1; Fig. 5 is a perspective view showing a wing brick and a brick for one of the central spans on a larger scale; Figs. 6, 7, and 8 are respectively a side and end elevation and plan view of the brick used on the central spans; Fig. 9 is a section taken on the line IX—IX of Fig. 8; Fig. 10 is a side elevation of the brick illustrated in Figs. 6, 7, 8, and 9, but on a larger scale to illustrate certain of the details thereof; Fig. 11 is a side elevation of the brick used to form the wings of the arch; Fig. 12 is an enlarged view of the tube end of a wing or side brick; Fig. 13 is a plan view of the brick shown in Fig. 11; Fig. 14 is a section taken on the line XIV—XIV of Fig. 13; Figs. 15 and 16 are sectional views respectively showing a combination arch built up from my improved construction of brick; and an arch of another distinct type; and Fig. 17 is a sectional view showing a portion of still another type of arch.

Referring to Fig. 1, it will be seen that I have therein shown in diagrammatic form a standard type of locomotive fire box comprising an inside and an outside box. The inside firebox is composed of the inside throat sheet 1; the flue sheet 2; the crown sheet 3; the side sheets $3^a$; and the door sheet 4. The outside fire box comprises a throat sheet $1^a$; side sheets $3^b$; and an outside back sheet $4^a$, the top sheet being not shown. The usual water legs formed by the walls of the inside and outside fire boxes are closed by the mud ring 5. Only a part of the flues 6 which extend forwardly of the flue sheet 2 are shown. The circulation tubes 7, of which in a wide box there are preferably four to six, extend rearwardly and upwardly from the inner throat sheet 1 and connect the front and rear water legs, access being had thereto by means of the plugs 8.

The type of arch indicated in Figs. 1 to 5 inclusive I have designated as a whole by the reference letter A and this arch comprises three central spans $a$, $b$, $c$, (see Fig. 3) each composed of a plurality of arch bricks of a construction to be described, and two wing spans $d$ and $e$ which are also composed of a plurality of wing bricks to be described. The central spans are supported on the circulation tubes 7 and the wings are supported from the inside side sheets $3^a$ and the outermost circulation tubes 7. In this type of arch I prefer not to carry the wings back as far as the central spans for a purpose which will hereinafter appear.

The central spans $a$, $b$, and $c$, are made up from one form of brick $f$, the specific construction of which is shown on a large scale in Figs. 6 to 10 inclusive. This brick has a substantially flat face 9 on one side, and on the opposite side or face the portions intermediate the ends of the brick are chamfered or cut away or beveled from about the middle of said face toward the edges of the bricks to a point beyond the median line of the brick which I have indicated at 10, Fig. 6, and which will hereinafter be termed the median plane of the brick. I prefer to form the chamfered faces somewhat in the nature of an ogee curve 13, leaving a central rounded ridge 14. At one end of the brick, and on each side of the median plane 10, the corner portions are cut away to provide the supporting seats 11, these seats being more or less flattened to more readily permit the brick to accommodate itself to variations in the distances between circulation tubes. This form of supporting surface is adapted to allow the brick to adjust itself to the tube.

At the opposite end, and also on both sides of the median plane 10 of the brick, the corner portions are ribbed as at 12, such ribs being preferably formed on the radius of a circle. The ribbed portions 12 are not coextensive with the brick, however, the portions $12^a$ intermediate the sides of the brick being cut away slightly deeper so that the brick engages the circulation tubes at two spaced points. The brick thus better accommodates itself to irregularities in the circulation tubes, such for example as occur at about the middle portion of the tubes where there is often a decided bend.

An additional advantage is incident to this construction of the brick by reason of the fact that, if necessary, the ribbed portions 12 may be readily chipped to make a proper fit. The opposite end of the brick (see Fig. 8) is fluted or corrugated or waved in construction, and it will be noted that the corrugated or waved end of the brick is so arranged that when a pair of the bricks are placed in opposed relation the waved portions will interfit, thus providing a larger range of compensation for variations in the spacing of the circulation tubes, as for example where the tubes are quite widely spaced. It will be noted that the chamfered portions and the supporting surfaces 11 and 12 on the chamfered face of the brick are so arranged as to provide strengthing walls 15 which extend across the brick.

From the foregoing it will be noted that my improved arch brick is invertible and may be supported on the circulation tubes either face up, a firm support being always insured by reason of the character of the supporting seats 11 and 12. The brick is also simple in construction and its body is so disposed as to secure maximum strength and superior wearing qualities no matter which face is placed up.

The wings are comprised of bricks $g$, such bricks being wedge shaped with the large end adapted to be supported on the outermost circulation tubes. At the outer or thinner end, the bricks $g$ are rounded on both faces to provide a single point of support 16 which is adapted to rest against a side sheet and support the brick either face up. At the opposite, or tube engaging end, I have formed directly in said end two curved seats 17, one located on each side of the median plane 10 of the brick. Intermediate the faces of the brick these curved portions 17 are deepened as at $17^a$ so that the brick will engage a circulation tube only in the curved sockets on the ends. The wing brick therefore has a three point support when placed either face up, by reason of which, although invertible, a firm support is always secured, this three point form of support being particularly advantageous because of the fact that the inside side sheets $3^a$ often slope inwardly toward the rear, as will be seen on inspection of Figs. 2 and 3.

Another advantage of this three point form of support in connection with this particular type of brick is that in a structure as shown, the seat which rests upon the tube will find a stable support even where the tube has considerable curvature, and whichever side of the brick may be placed uppermost. As in the case of the form of brick used for the central spans of the arch, the wing bricks have a plane face 9 on one side, while the opposite side is chamfered or cut out intermediate the ends, leaving strengthening walls 15.

The type of arch A, it will be seen, is formed by placing the bricks $f$ constituting the central spans in alternate inverted relation on the circulation tubes 7; and when the bricks are thus assembled, because of the fact that the chamfered portions extend beyond the median plane of the brick, oppositely directed channels $h$ are provided, such channels extending through the arch. The wing brick $g$ are also assembled in alternately inverted relation, thereby providing similar channels $h'$ in the wings. In a preferred form of my invention I place the bricks in such a manner that the apertures on opposite sides of any given supporting tube will occur in staggered relation as indicated in several of the figures. That is to say, I make such a disposition of the bricks that where at a given point, say at the left of one of the tubes, an opening is presented with its converging sides directed upwardly over the rib of the brick, the opening which comes on the other side of the tube is moved along preferably to the extent of one course of brick so that the main body of the arch, with respect to its plane surface and also its apertured portions will present a kind of checkerboard appearance from above.

By this arrangement of arch a number of advantageous results are obtained. For example a uniform and equalized draft is secured practically over the entire fire bed, which of course causes the bed of fuel to burn more evenly and equalizes combustion conditions throughout the fire box. At the same time there is a more intimate admixture of the gases and other products of combustion. More complete combustion is also secured because such gases as are not thoroughly consumed below the arch are consumed immediately above it because the channels $h$ direct the jets of the products of combustion against each other so that they intermingle, thereby reducing the wastage from unconsumed products to a minimum. This more thoroughly commingling of the gases produced because of the impingement of the jets upon each other on the upper side of the arch in the manner indicated will not only reduce the amount of waste incident to poor combustion but will also because of the more perfect combustion, increase the temperature at the point where the different jets commingle and such higher temperature will be effective upon the inner and upper walls of the fire box, both directly and by reason of the radiation action from the upper side of the arch. Furthermore, superior heat radiation conditions are obtained, and it is possible to construct an arch of greater dimension than has heretofore been practicable. As a result of the foregoing, it will be evident that the efficiency is greatly increased while at the same time a far greater amount of protection for the ends of the flues 6 is obtained, all of which I have demonstrated by actual comparative tests.

In addition to the advantages hereinbefore enumerated, it will also be apparent that this form of arch is self-cleaning to a large extent, for it will be seen that the unconsumed matters which deposit on the arch will work their way through the channels $h$ and $h'$. Such deposits, however, are relatively small because of the superior combustion obtained.

It will be noted that the bricks may also be assembled in such manner as to constitute an arch of the type shown in Fig. 16 which type I have designated by reference letter B. The bricks in this type are arranged with all the flat faces up, which arrangement while not providing the channels $h$ and $h'$, nevertheless secures a corrugated under face against which the products of combustion impinge and therefore improve combustion conditions.

Again, in Fig. 17 I have shown another type C of arch which may be constructed from the form of brick described. In this type the flat faces of the bricks are down.

In Fig. 15 I have shown a composite form of arch D constructed from my improved bricks, in which form a certain number of bricks are placed with the chamfered face down while the remaining bricks are assembled in alternately inverted relation.

It will therefore be observed that by my improved form of brick three distinct types of arches may be constructed while at the same time it is possible to make an arch embodying any desired combination of these types and that these modifications can be made in any desired place in the arch, thereby adapting the arch to any kind of particular service which is to be met and this in such manner as to secure maximum efficiency. It will also be apparent that the bricks may be readily renewed or replaced as occasion may require and that even after an arch has been constructed it may be quickly altered to suit change in service conditions.

One very marked advantage of my invention is that I find that I am enabled to secure superior results in what are known as low crown fire boxes, that is fire boxes which are shallow in depth. Heretofore it has been difficult, if not impossible, to secure efficiency and also sufficiently protect the flues from the action of the fire. In such low crown fire boxes I have found the type of arch illustrated in Fig. 1 to secure most efficient results while at the same time adequate protection for the flues is insured.

The wings of the arch may be carried rearwardly as far as may be required for the particular conditions of service, thus for example in Fig. 1 the wings of the arch are carried rearwardly about three-fourths of the total length of the arch while in Figs. 15 and 16 the wings are almost co-extensive with the central spans. By omitting one or more of the wing bricks as shown, the draft conditions at the sides of the fire box may be altered so as to increase or decrease the amount of draft at those points.

Still another advantage incident to my improved form of arch brick is that in some cases it is unnecessary to provide spacing means adjacent the tube or inner throat sheet 1 adapted to space away the adjacent bricks of the central spans and wings. This is illustrated in Fig. 17, from inspection of which it will be seen that the top edges of the bricks engage the tube sheet 1 in such manner as to space the bricks away from said sheet providing a circulation channel immediately adjacent such sheet, as shown by the arrow in Fig. 17.

In addition to the novel features hereinbefore described, attention is also directed to the location of the tube-engaging sockets 17 in the end of the wing bricks. By making the brick of wedge shape and placing these sockets directly in the end thereof, any interference between the wing bricks and the bricks of the adjacent central spans is entirely eliminated and a firm support always provided. In addition, the wing bricks are more securely held and not so liable to become displaced by jolting.

I claim:

1. An invertible arch brick adapted to be supported adjacent the ends thereof, either face up, having a substantially flat face on one side and having its side portions on the other face chamfered to a point beyond the horizontal median plane of the brick.

2. An invertible arch brick adapted to be supported adjacent the ends thereof, either face up, having the portions on each side on one face of the brick chamfered to a point beyond the horizontal median plane of the brick.

3. An invertible arch brick having the portions on each side on one face of the brick chamfered to a point beyond the horizontal median plane of the brick and having support engaging means at the ends whereby the brick may be supported either face up.

4. An invertible arch brick having a substantially flat face and having its side portions on the other face chamfered to a point beyond the horizontal median plane of the brick and having support engaging means at each of two opposite ends on both faces whereby the brick may be supported either face up.

5. An invertible arch brick having a substantially flat face and having its end portions cut away to form supporting surfaces, and having a part of the portions of the brick intermediate the cut away end portions chamfered at the edges of the brick to a point beyond the horizontal median line of the brick, said chamfered portions extending short of the cutaway end portions, thereby leaving strengthening walls adjacent to the cutaway end portions.

6. An invertible arch brick having supporting surfaces on opposite sides of the horizontal median plane of the brick at each of two opposite ends of the brick, and a cutaway portion extending from one face to the edge of one of the sides of the brick past the median plane.

7. An arch comprising a plurality of invertible substantially counterpart arch bricks, each having support engaging means and oppositely disposed cut-away portions, and adapted when placed in alternate inverted relation to provide converging channels in the arch between bricks and when placed in the same relation, to provide a corrugated surface on one side of the arch and a substantially plane surface on the other side of the arch.

8. In a furnace arch, spaced water tubes, and an arch wall consisting of baffle units supported on said tubes, said units being so constructed that when they are all arranged in one position a wall of unbroken continuity is formed and when certain of the units are arranged in another position openings are afforded in said wall.

9. A locomotive arch composed of a plurality of baffle units spanning the distance between supporting members, said units being so constructed that when they are all arranged in one position they form an arch of unbroken continuity but when certain of said units are arranged in another position openings are afforded through the arch.

In testimony whereof I have hereunto signed my name.

ALFRED H. WILLETT.